(12) United States Patent
Aloe et al.

(10) Patent No.: US 7,840,481 B2
(45) Date of Patent: Nov. 23, 2010

(54) AGED TRANSACTIONS IN A TRADING SYSTEM

(75) Inventors: Paolo Aloe, White Plains, NY (US); Brian Carr, Fair Haven, NJ (US); Dan Weingarten, Plainview, NY (US)

(73) Assignee: BNY Convergex Execution Solutions LLC, New York, NY (US)

( * ) Notice: Subject to any disclaimer, the term of this patent is extended or adjusted under 35 U.S.C. 154(b) by 379 days.

(21) Appl. No.: 11/759,830

(22) Filed: Jun. 7, 2007

(65) Prior Publication Data

US 2008/0306856 A1    Dec. 11, 2008

(51) Int. Cl.
G06Q 40/00 (2006.01)
(52) U.S. Cl. .......................................... 705/37; 705/26
(58) Field of Classification Search .................... 705/26, 705/37
See application file for complete search history.

(56) References Cited

U.S. PATENT DOCUMENTS

| | | | |
|---|---|---|---|
| 2002/0023037 A1 | 2/2002 | White, Jr. | |
| 2002/0052827 A1 | 5/2002 | Waelbroeck et al. | |
| 2002/0091621 A1 | 7/2002 | Conklin et al. | |
| 2002/0099645 A1 | 7/2002 | Agarwal et al. | |
| 2002/0184136 A1* | 12/2002 | Cleary Neubert et al. | 705/37 |
| 2004/0034591 A1* | 2/2004 | Waelbroeck et al. | 705/37 |
| 2004/0143542 A1 | 7/2004 | Magill et al. | |
| 2005/0055304 A1 | 3/2005 | Lutnick et al. | |
| 2005/0055305 A1 | 3/2005 | Lutnick et al. | |
| 2005/0080698 A1 | 4/2005 | Perg et al. | |
| 2006/0026090 A1 | 2/2006 | Balabon | |
| 2006/0031157 A1 | 2/2006 | Gianakouros et al. | |
| 2006/0271475 A1 | 11/2006 | Brumfield et al. | |
| 2006/0277136 A1 | 12/2006 | O'Connor et al. | |
| 2008/0275808 A1* | 11/2008 | Mackay | 705/37 |

* cited by examiner

*Primary Examiner*—Jagdish N Patel
*Assistant Examiner*—Sara Chandler
(74) *Attorney, Agent, or Firm*—Kelley Drye & Warren

(57) ABSTRACT

A method and system for aging orders, increasing securities market liquidity.

19 Claims, 2 Drawing Sheets

AGED TRANSACTIONS IN A TRADING SYSTEM

BACKGROUND OF THE INVENTION

Figure 1:
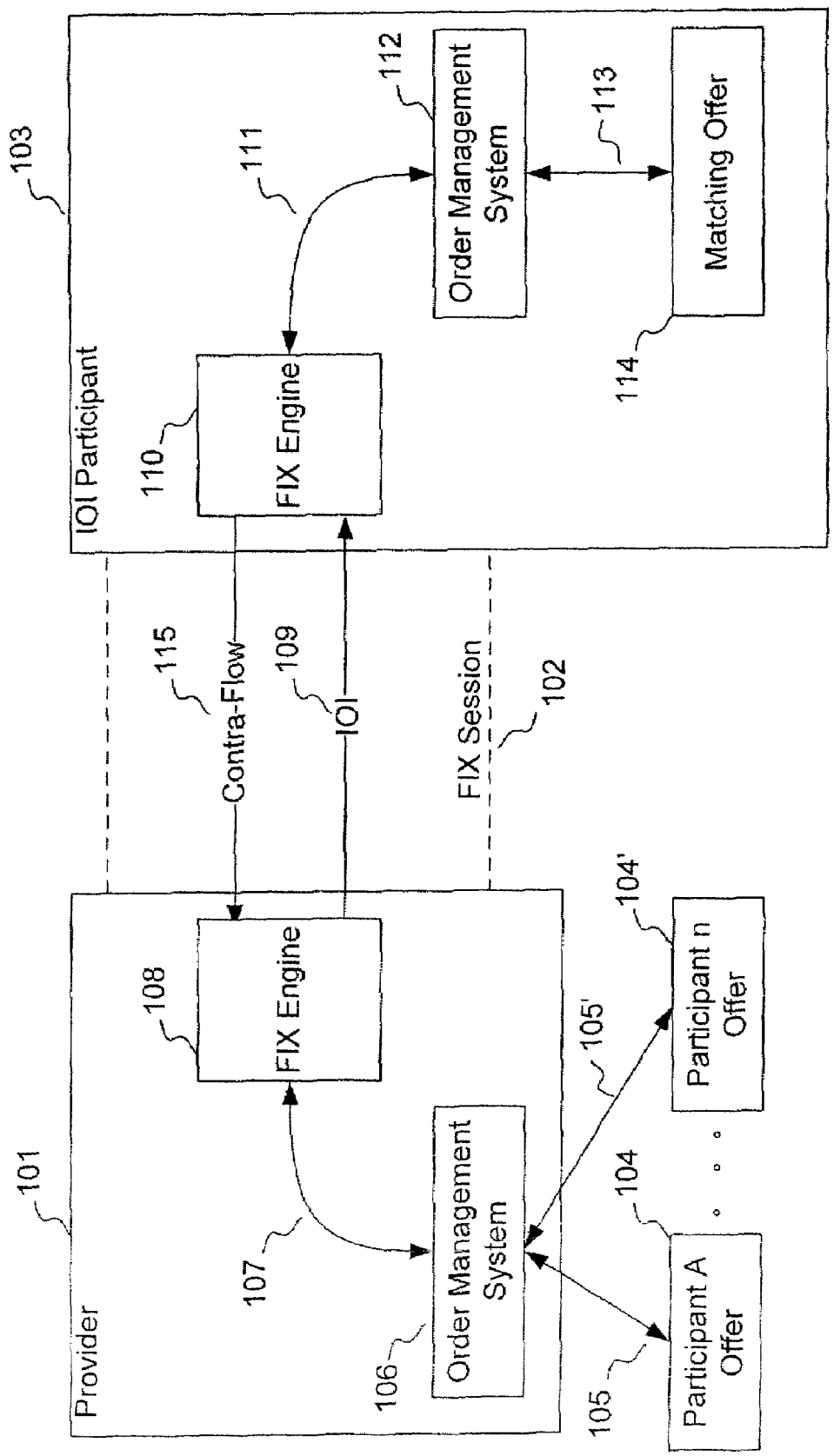

All references cited in this specification, and their references, are incorporated by reference herein where appropriate for teachings of additional or alternative details, features, and/or technical background.

FIELD OF THE INVENTION

The present invention generally relates to securities trading using a computer network.

DESCRIPTION OF THE RELATED ART

Stocks, bonds, commodities, derivatives and other securities are primarily handled through a number of trading systems. Through each of these systems the trader seeks the "best execution." Under the Investment Advisers Act of 1940, every registered investment adviser, such as Institutional Investors, in particular has a duty to obtain "best execution" on all securities transactions for their clients. "Best price" is only on factor in "best execution," with other factors being weighed in the mix such as execution capabilities, commission rate, financial responsibility, and responsiveness.

The most traditional system for trading securities is the stock exchange exemplified by the New York Stock Exchange ("NYSE") and the New York Mercantile Exchange ("NYME"). The stock exchange has conventionally had two primary functions: (1) the listing of securities; and (2) acting as a marketplace of its members to trade the listed securities. Besides offering the market a trading system, the stock exchanges have also managed price information. In such exchanges, a single registered stock dealer who has a seat on the exchange (such as a registered stock specialist) makes the market for each security. Buy and sell, or bid and offer, prices are supplied by the dealer/specialist to the exchange and to brokers through the dealer/specialist's trading computer terminal. That is, trading on such exchanges is conducted through intermediaries on the floor of the exchange, with buyers and sellers not negotiating or trading directly. Orders are matched by the dealer/specialist and the dealer/specialist confirms execution with the trading terminal and an automated central order book. Security brokerage firms may use an automated transaction system with such traditional exchanges for matching buy and sell orders for securities, such as the DOTS ("Direct Order Transmission System") of the New York Stock Exchange.

Another common trading system is made up of electronic exchanges which utilize electronic access to dealer posted market prices without a negotiating specialist or floor-based exchange. In such system, dealers, known as "market makers," trade a significant number of shares in a stock in their own name, thereby proofing from the spread (i.e., the difference between the price which they purchase shares and the price for which they sell them). Such market makers are often large financial institutions which bid and offer stock for their customers or for themselves. Such system may be entirely computer-based. One of the largest of the totally computer-based markets is NASDAQ (the "National Association of Securities Dealers Automated Quotation" market) which was introduced in 1971 which trades in over-the-counter stocks. The SOES ("Small Order Execution System) of NASDAQ permits complete electronic matching of buyers and sellers.

A number of Alternative Trading Systems ("ATS") have emerged since the 1970s, the first being the ECN Instinet. These systems allow participants to trade listed securities among themselves without the need to be a member of a stock exchange. Participants can enter their buy or sell orders into a computerized system that automatically checks of prices at which these orders can be matched. Interaction is direct independent of a broker, market maker or a specialist. An ATS is defined by Rule 300(a) of the Security and Exchange Commission's Regulation ATS as "[a]ny organization, association, person, group of persons, or system that constitutes, maintains, or provides a market place or facilities for bringing together purchasers and sellers of securities or for otherwise performing with respect to securities the functions commonly performed by a stock exchange . . . [t]hat does not: (1) (s)et rules governing the conduct of subscribers other than the conduct of such subscribers' trading on such organization, association, person, group of persons, or system; or (2) (d)iscipline subscribers other than by exclusion from trading." The SEC under Regulation ATS (issued in 1998) requires ATS purveyors to register as either a market participant (e.g., broker) or as an exchange.

A significant advantage of an ATS system is that it provides the accessing of liquidity anonymously. The buyer and seller are anonymous to one another with trade execution reports listing the ATS as a party. The first indication that an ATS has orders on its book occurs after a match is found. By avoiding intermediaries, a buy side trader avoids the perils of displaying its order to the street. For example, buy side trader can avoid a specialist buying/selling stock ahead of the requested order for a penny above its limit, and the broker shopping around the order and inevitably running the price in an unfavorable direction because the buy side trader has shown its hand.

ATS systems include Electronic Communication Networks ("ECN"), Call Markets, Matching Systems, and Crossing Networks ("CN"). A Crossing Network is a system defined by the SEC as allowing participants to enter unpriced orders to buy and sell securities and that crosses orders at specified times at a price derived from another market. That is, it references systems that match orders at the broker-dealer using prices from an exchange, without actually sending the order to a public venue. An ECN, arising in the marketplace around 1998, is defined by the SEC as electronic systems that widely disseminate to third parties orders entered by an exchange market maker or OTC market maker and permit such orders to be executed against in whole or in part. ECNs typically are centralized, computer-based order matching systems that display bids and offers of subscribers to the ECN and automatically match subscriber orders if bids match offers, otherwise, the best prices are posted on NASDAQ to compete with the market makers. The ECN matches contraside orders typically with the same price and share count A traditional ECN will post unmatched orders on the system for other subscribers to view. The only securities traded on ECNs are liquid, registered securities which trade in significant volumes and are listed on traditional exchanges or broker networks such as NASDAQ. ECNs make a profit from paying liquidity providers a credit while charging a debit to liquidity receivers. A Call Market ("CM") is an auction market where orders are grouped until they reach a certain amount, and then executed together at a predetermined time. Electronic Trade Matching Systems do the same thing the brokers did earlier—get buyers and sellers together so that they can deal at a price acceptable to both of them and publish these prices in real-time. At the center of this system is an order book which stores the buy and sell orders that have been received for the various listed stocks. There are usually different order books for different types of trades. For example, the option trading market will have a different order book from the equity cash market Non-ECN ATSs are generally electronic and service institutional markets. They include: NYSE crossing sections, Posit (ITG, Inc.), Liquidnet, Tri-Act (ITG, Inc.) and NYFIX Millennium. Some systems, such as NYFIX's Millennium and ITG's TriAct permit "Pass-Through" orders, with the Pass-Through ATS allowing for transaction on the order if a contra-order exists on its system, while passing-through the order to another trading system, such as a conventional exchange, if contra-order is not available on its system. In this regard, a Pass-Through ATS does not position itself as the final destination of a Pass-Through order. This is in opposition to most traditional markets that are "sticky," that is, when a specialist receives the order there is an effort to avoid sending the order elsewhere. Such Pass-Through ATS systems further "internalize" their customer order flow in the sense of pairing off buyers and sellers and executing the trade.

Trade orders may be specified with multiple attributes, such as price and time-in-force. Time-in-force defines the length of time over which an order is transactable upon before it is cancelled. Time-in-force orders include, without limitation, orders such as the Day Order ("DAY"), the Good-til-Date ("GTD") order, the Good-Til-Canceled ("GTC") order, the Immediate-Or-Cancel order, and the Fill-or-Kill ("FOK") order. A Day Order ("DAY") is an order that terminates automatically at the end of the business day if it has not been filed. A Good-til-Date ("GTD"), on the other hand, is a perpetual order only terminated by an execution or arrival of a user specified date; while the Good-Til-Canceled (GTC) order typically lasts for a set period of time, for example 30 days, and remains until it is either executed or until the profferror chooses to cancel it. An Immediate-Or-Cancel ("IOC") offer requires immediate transaction on the offer with execution of as much of the order as possible, with the remainder of the offer being cancelled if immediate transaction does not occur. Similar to an IOC order is the Fill-or-Kill order ("FOK"), a trade offer submitted for immediate execution in whole against standing counter offers. Immediate-Or-Cancel ("IOC") orders and "FOK" orders may be characterized as Immediate Execution Orders ("IEO"), that is orders that are cancelled if immediate execution at the ultimate trading site is not completed. On the other hand, Non-Immediate Execution Orders ("NIEO"), such as a DAY, GTC or GTD, in the fact of being held on the book of the matching engine for a period of time and being subject to multiple execution checks allow for multiple matching cycle exposures. Orders may also be defined by the trade level in force, for example, without limitation, as the Stop Order ("SO") or the Limit Order ("LO"). A Stop Order ("SO") is an order that trades after a specified price level has been reached A Limit Order ("LO") is an order to execute a transaction only at a specified price (the "limit") or better, with a limit order to buy being at the limit or lower, and a limit order to sell being at the limit or higher. Trade Level orders, such as the Stop Order ("SO") and Limit Order ("LO") may also constitute time-in-force orders, that is they may be time limited like a DO or GTC order. Of course, the field has many other types of orders defined by their limiting parameters.

Traders using ATS trading systems often submit Immediate Execution Orders ("IEO") such an IOC or FOK. As explained above, submission of an IOC or FOK type order will be cancelled if the return is a null matching cycle, that is, if the single pass through the ATS registry of resident orders fails to find any matching trade. Unlike a FOK-type order which seeks a complete trade of the entire offer, IOC type orders pursue trade for any portion of the offer, up to and including the entire quantity of shares. A single pass of the matching cycle, nevertheless, may prove insufficient if a matching offer for the partial trade is not found. Cancellation with respect to an immediate execution order (e.g., an IOC or FOK order) may be made from the ATS system to its client, or if the system is being used as a Pass-Through Exchange, after the immediate execution order (e.g., an IOC or FOK order) order passes-through its ultimate destination, such as a conventional exchange (that is, if the ATS system can not find a match). Failure to make a trade within the defined parameters of an order is an undesirable outcome for any trader.

Outside the current "black box" of Alternative Trading Systems, merchandise in the securities market is advertised within select groups of institutions interested in finding liquidity for large block trades with minimal market impact. This targeted advertising is accomplished using Indications-of-Interest (IOIs) disseminated to eligible parties to foster interest and ultimately seek trade of the advertised securities. An indication of interest ("IOI"), is an expression of intention to buy or sell securities broadcast by broker-dealers to it's institutional counterparties. It may be compared to an unsolicited quote. The IOI typically states the name of the security, the size of the trade and the price. This information is distributed with the intent of finding an opposite party for the transaction, thus creating a natural trade execution. IOIs are advertised to stimulates contra-flow interest. Contra-flow is a stream of trade orders back to the originating system. An IOI may prompt an institutional user of the system to react to an order with contra-flow that would not have existed other than due to the terms and size of trade advertised in the IOI.

While ATS systems are known for their fast speed in transaction, the present inventors have recognized that the current system set up of an ATS, and in particular non-ECN ATS systems, particularly non-ECN ATS Pass-Through Systems, are not optimized for making trades with respect to Pass-Through orders and immediate execution orders (such as IOC and FOK orders). The present inventors have developed methods and systems that allow for the generation of IOIs with respect to particular securities from an aggregate of pass-through orders of any type, including immediate execution orders ("IEO"), within a Pass-Through system and within the very small time frame permitted for executing upon such orders and canceling them or passing them through to their ultimate destination. Such methods and systems allow for more executions upon pass-through orders and immediate execution orders (such as IOC and FOK orders) within the confines of the ATS system than previously possible, therefore improving liquidity in transactions.

SUMMARY OF THE INVENTION

There is provided herein exemplary embodiments directed to the aging of trade orders, and the generation of indication-of-interests within the aging period.

In one embodiment, there is disclosed a method for generating an indication-of-interest ("IOI") with respect to a particular security in an Pass-Through Alternative Trading System ("ATS"), and transacting upon contra-flow with respect to said Indication of Interest ("IOI"), said method comprising the steps of: obtaining at least one pass-through order and/or immediate execution order to buy or sell a particular security within a price range having an ultimate destination other than the alternative trading system initially receiving it; aging the pass-through order(s) and/or immediate execution orders for a period of time before passing through the pass-through order to its ultimate destination or canceling the order; if a preset trade amount of a particular security is attainable from said pass-through orders or immediate execution orders during their aging period, generating from one or more of said pass-through orders and/or immediate execution orders that are executable within an advantageous spread to the alternative trading system at time x, an IOI to buy or sell a specified amount of the particular security in a specified price range; transmitting the IOI to one or more of IOI subscriber(s) to the ATS system; upon receipt of contra-flow from one or more IOI, transacting at a time y upon at least a portion of the IOI during the aging period if contra-flow is received when the spread is favorable to the ATS, and canceling any remaining portion of the indication-of-interest not transacted upon after the aged period of time. The step of generating the indication-of-interest may be subsequent to a failure of one or more orders resulting in the indication-of-interest to be satisfied in the ATS system. The ATS system may be a non-ECN ATS system. The ATS system in which said method is performed may be configured to prohibit display of security interest or orders to a user of the system.

In another embodiment, there is disclosed a computer-enabled system designed to generate an indication-of-interest with respect to a particular security in an pass-through alternative trading system ("ATS") designed to transact upon a securities order to buy or sell, comprising: a user module operatively configured to transmit a pass-through order to buy or sell a particular security within a price range from a user; a database operatively connected to said user module configured for holding a plurality of pass-through orders to buy or sell a particular security within a particular price range generated by one or more of said user modules; a timer module operatively connected to said data base, said timer module configured to permit and to control aging of said pass through orders; a transaction module operatively connected to said database, said transaction module configured to generate an indication-of-interest with respect to a particular security based upon the aggregation of two or more of said pass-through orders, said indication-of-interest being transactable upon within a period permitted by said controlled aging of said pass-through orders contributing to the indication-of-interest if contra-flow is received while the IOI is within a favorable spread to the ATS.

Further, there is disclosed a system for controlling the aging of pass-through orders to buy or sell a particular security within a price range, said system comprising: a database configured for holding a plurality of pass-through orders to buy or sell a particular security within a particular price range; and a timer module operatively connected to said data base, said timer module configured to allow variable aging times of said pass through orders.

BRIEF DESCRIPTIONS OF DRAWINGS

Figure 2:
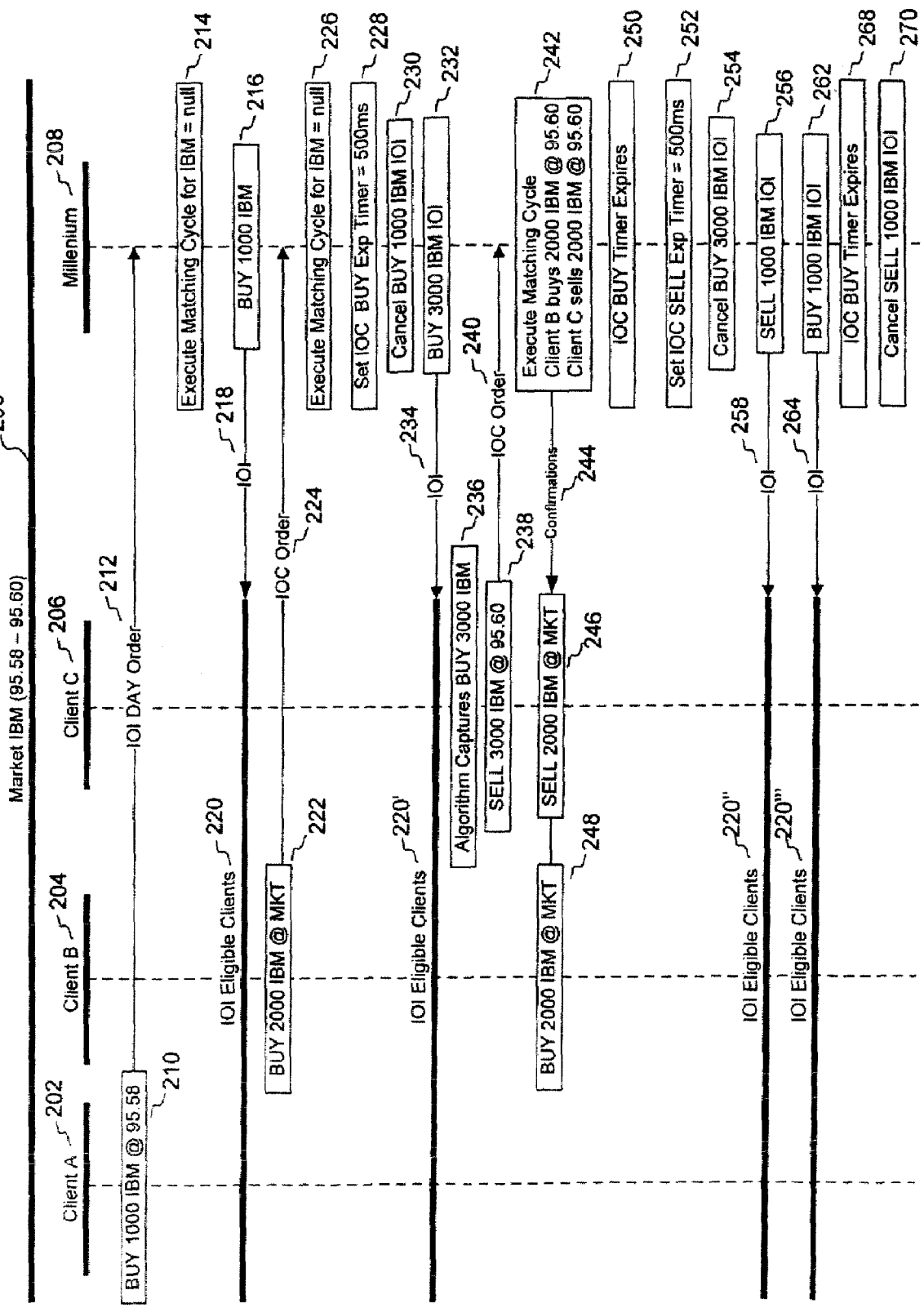

Embodiments of the invention are illustrated in the accompanying drawings in which:

FIG. 1 is a block diagram illustrating an exemplary embodiment of a securities trading system; and FIG. 2 is a process diagram illustrating an exemplary embodiment of aged order processing in a transaction system.

DETAILED DESCRIPTION OF THE INVENTION

There is disclosed in embodiments herein an aged order transaction system and method that allows increased liquidity of securities traded on a computer network. Such embodiments electronically disseminate IOIs within the aged pass-through order and/or immediate-execution order expiration time to solicit contra-flow. Such embodiments allow for the solicitation of contra-flow with the short life of the pass-through and/or immediate execution order with no human interaction.

In one embodiment, the system and methods comprise a pass-through order, or an immediate-execution order (such as an IOC or FOK order) which are aged for a period of time before pass-through or canceling the order. Aging may be on the order of milliseconds, for example, about 25 milliseconds to 800 milliseconds, or about 50 milliseconds to 600 milliseconds, or about 75 milliseconds to about 400 milliseconds. During the aging process, it is determined whether one or more such pass-through orders and/or immediate-execution orders can be aggregated to form an indication-of-interest (IOI) with respect to a particular security that may be passed along to IOI subscribers, such as institutional investors. In an advantageous embodiment the IOI is transactable upon when a contra-flow order is received during a period in which the IOI is in a favorable spread to the generator of the IOI. The generator of the IOI may be an ATS trading system, for example, a non-ECN ATS trading system. IOI subscribers may be institutional investors which have subscribed to receive and transact upon IOIs from the ATS trading system.

System embodiments may comprise an ATS, and in particular a non-ECN ATS, which acts as a pass-through portal to other sites, such as an exchange. Method embodiments may be run on such ATSs. Method embodiments may be implemented by software means, or by a combination of software and hardware components. Securities that may be traded using such embodiment methods and systems may include, without limitation, stocks, bonds, futures and options. Security trade orders may include, without limitation, orders to buy or orders to sell such securities on a computer network, such as for example a private network, or a widely disseminated public network such as the Internet.

In certain embodiments, the aged order technique is applied on an Alternative Trading Systems (ATS). As discussed above, Alternative Trading Systems operate on a black box paradigm, wherein orders are not displayed, insuring market anonymity. Such systems may include multiple computers or machines, acting in concert with one another. Such systems may further include multiple computer networks operating together to effectuate a securities trade. Machines, processors, servers and the like may be utilized in the ATS, and system embodiments described herein, may be virtual, and may be implemented in software to varying degrees, in one or more locations.

In an embodiment, a method is provided to allow orders that would otherwise be immediately passed-through an ATS unless a contra-order match was found in the ATS system to be aged sufficiently long to allow for an Indications-of-Interest (IOIs) to be formulated. In such embodiment, an IOI is generated if one or more aged orders can be aggregated sufficiently to meet a minimum threshold level of orders with similar trading restrictions within the aging period. The ability of a pass-through ATS to generate an IOI before passing-through the order to its final destination increases the likelihood that the order can be transacted upon within the milieu of the ATS. The aging feature may be accomplished through an expiration timer operatively configured to keep the order alive in the matching engine's book for the duration set by the timer. The expiration timer may comprise software, or a combination of software and hardware components.

In embodiments, participation in a trade via the IOI may extend beyond the local ATS network to facilitate execution of a trade. Execution of a trade may include communication across a network via a standardized protocol, such as for example the Financial Information Exchange (FIX) protocol (a vendor-neutral standardized message format, session-based, protocol for describing real-time security transactions which is owned and maintained by FIX Protocol Ltd.). Participants in a trade may exist on separate ATS networks communicating over a link supported by a session implemented from a protocol, such as for example a FIX protocol, wherein the session is a FIX session.

In one embodiment, matching orders are exposed to one or more matching cycle. The order, which may be a conditional order, can carry the IOC value in the TimeInForce FIX field (59=3), (that is, wherein "3" represents "Immediate-or-Cancel"), to which the ATS attaches a configurable system-wide "short" expiration timer. Short, may include without limitation timers on the order of one second, or timers on the order of fractional seconds, such as five hundred milliseconds. The duration of the timer may be variable.

In an alternative embodiment, matching orders may be exposed to one or more matching cycles. The order, which may be a conditional order, can carry the IOC value in the TimeInForce FIX field (59=6), that is wherein "6" represents "Good-till-Date"), equivalent to a Good-Till-Date (GTD); wherein the ExpireTime (FIX tag 126) has "today" as the date and "now" as the time (where "now" is the time the ATS receives the order) plus the configurable timer as the time.

Pass-Through orders, as immediate execution orders, may be aged by attaching an expiration time to the order, keeping it live in the matching engine's book for the duration of the timer, and generating an IOI to solicit contra-flow. The IOI process could also be used for other order types such as DAY orders, simply by attaching an expiration tinier to the order and generating an IOI from DAY orders which allow for a minimum level of trade of a particular security with similar transaction requirements. Such IOIs are advantageously consumed by automated "black box" programs with no possibility of human interaction, wherein only routing decisions are made (i.e., decision to send an order and where), but not trading decisions (i.e., the decision to buy or sell a security).

Further to the forgoing embodiments, Indications-of-Interest (IOIs) that may result from the aged immediate-execution order flow, such as IOC flow, or pass-through orders, may be targeted to computer programs, primarily "dark algorithms", that can interact with multiple execution venues, such as for example Electronic Communication Networks (ECNs), exchanges, ATSs, and internalization engines. All features may be enabled together or separately from one another over the same session, such as a FIX session.

FIG. 1 illustrates one embodiment of an ATS; wherein an Indication-of-Interest 109 is provided to induce contra-flow orders. Participant A 101, and Participant B 103, communicate via a FIX session 102. A FIX session is communication layer that manages the transport of order messages based on the standard of the FIX protocol. The FIX protocol is a paradigm for communications format, whereby trading parties agree on specific usage and content of fields subject to the guidelines and definitions provided within the specification. A FIX session, guarantees that messages are delivered in the order in which they are sent and can be defined as a bi-directional stream of ordered messages between two participants. The protocol is supported by FIX engines at each participant.

Participant A 101 and Participant B 103 operate to provide pass-through order matching execution for a market. The system of Participant A 101 includes an Order Management System 106, a FIX engine 108 and the processor configured to manage communications with another participant. Likewise, Participant B 103, may have similar means and subsystems, such as Order Management 112 and FIX engine 110. An offer 104, presented to Participant A 101, may generate an Indication-of-Interest 109 and resulting Contra-Flow 115, in a effort to execute the offer communicated by pathways 105, 107, 111, and 113. If a matching offer 114 exists and is communicated to Participant B 103 during the life of the aged conditional order, the Contra-Flow 115 may result in matching cycle execution success. Communication pathways 105, 107, 111, 113, and FIX session 102 may also provide for order execution confirmations, such as may occur, if a matching cycle results in a successful trade.

FIG. 2 illustrates a process diagram of an exemplary trading transaction for a security known as IBM. Providing a market 200 where IBM is trading at 95.58 to 95.60 dollars per share, client A 202 sends a BUY order 210 for 1000 IBM shares at 95.58 dollars per share. The order is issued and accepted as an IOI DAY Order 212 to the market participant 208, for example Millennium®, for execution at 95.58 or better. One matching cycle 214 is executed in response to the order but returns with no matches (null). IOI eligible clients 220 received an IOI 218 for a BUY order 216 of 1000 IBM shares from the market participant 208. Client B 204 generates a BUY order for 2000 IBM @MKT 222 and sends the IOC order 224 to market participant 208; where a matching cycle 226 is executed and returns no matches (null). The market participant 208 system sets the IOC BUY timer 228 to five hundred milliseconds and cancels 230, the forgoing BUY 1000 IBM IOI 218. IOI eligible clients 220' receive a new IOI 234 for a BUY 3000 IBM 232 from the market participant 208 system. Prior to the expiration 250 of the IOC timer on the market participant 208 system, an algorithm 236 captures the BUY 3000 IBM at Client C 206 and sends an IOC Order 240 as a result of the offer 238 SELL 3000 IBM shares at $95.60 per share, whereby market participant 208 executes a successful matching cycle 242 providing Client B and Client C trades of 2000 shares at 95.60 dollars per share. The market participant 208 sets an IOC SELL timer 252 to expire in five hundred milliseconds, cancels 254 the outstanding BUY 3000 IBM IOI 234. IOI eligible clients 220" receive an IOI 258 for a SELL, 1000 IBM order 256 and IOI eligible clients 220''' receive an IOI 264 for a BUY 1000 IBM order 262, prior to the expiration 268 of the SELL timer. After expiration 268 of the SELL timer, the market participant 208 cancels 270 the outstanding IOI 258 for the SELL order of 1000 IBM shares. The BUY 1000 IBM IOI remains outstanding as long as the DAY order from Client A 202 remains connected to market participant 208 and the order is marketable.

The combination of aged immediate-execution order flow and pass-through orders, and the resulting IOIs generated therefrom by the methods and systems described above, offers algorithmic and other computerized providers of order flow a powerful mechanism to interact with liquidity, taking advantage of ATS anonymity, speed and quality of execution.

STATEMENT REGARDING PREFERRED EMBODIMENTS

While the invention has been described with respect to the foregoing, those skilled in the art will readily appreciate that various changes and/or modifications can be made to the invention without departing from the spirit or scope of the invention as defined by the appended claims.

What is claimed is:

1. A method for generating an indication-of-interest ("IOI") with respect to a particular security in an Pass-Through Alternative Trading System ("ATS"), and transacting upon contra-flow with respect to said Indication of Interest ("IOI"), said method comprising the steps of:

obtaining by said ATS at least one order to buy or sell a specified amount of a security within a price range, wherein said at least one order has an ultimate destination other than the ATS initially receiving said at least one order and wherein said at least one order is a pass-through order or immediate execution order;

allowing at said ATS said at least one order to age for a period of time before passing said at least one order to its ultimate destination or canceling said at least one order and aggregating said at least one aged order with other orders during said aging period;

when said aggregated aged orders meet a preset trade amount for the security and is executable within a spread favorable to the ATS, the ATS generating, at time x, an IOI to buy or sell the specified amount of the security within the price range;

transmitting the IOI to at least one ATS IOI subscriber; and upon receipt of a contra-flow order responding to the IOI transmitted, transacting at a time y upon at least a portion of the IOI during the aging period if the spread is favorable to the ATS, and canceling any remaining portion of the IOI not transacted upon during the aging period.

2. The method of claim 1 further comprising the step of generating the indication-of-interest subsequent to a failure to immediately match said at least one order in the ATS.

3. The method of claim 1 wherein the ATS is a non-ECN ATS system.

4. The method of claim 1 further comprising the step of prohibiting, by the ATS, a display of a security interest or orders to a user of the ATS.

5. The method of claim 1 wherein the preset trade amount for a particular security necessary to generate an IOI is equal to or more than 10,000 shares of the security.

6. The method of claim 1 wherein the immediate execution order is an Immediate-Or-Cancel ("IOC") order.

7. The method of claim 1 wherein the immediate execution order is a FOK order.

8. The method of claim 1 wherein the pass-through order is a Good-Til-Date ("GTD") order.

9. The method of claim 1 wherein the pass-through order is a GTC order.

10. A system for generating an indication-of-interest ("IOI") with respect to a particular security in an Pass-Through Alternative Trading System ("ATS"), and transacting upon contra-flow with respect to said Indication of Interest ("IOI"), said system comprising:

a processor operatively configured to
receive at least one order to buy or sell a specified amount of a security within a price range, wherein said at least one order has an ultimate destination other than the ATS initially receiving said at least one order and wherein said at least one order is a pass-through order or immediate execution order;

age, by a timer associated with processor, said at least one order for a period of time before passing said at least one order to its ultimate destination or canceling said at least one order is required;

aggregate said at least one aged order with other orders during the aging period;

generate, at time x, an IOI to buy or sell the specified amount of the security within the price range when said aggregated aged orders meet a preset trade amount for the security and are executable within a spread favorable to the ATS;

a transmitter operatively connected to said processor and operatively configured to transmit the IOI to one ATS IOI subscriber; and a receiver operatively connected to said processor, said receiver operatively configured to receive a contra-flow order responding to the IOI transmitted;

wherein said processor is further configured to transact upon said contra-flow order at a time y when the spread is favorable to the ATS, and to cancel any remaining portion of the IOI not transacted upon during the aging period.

11. The system of claim 10 further comprising said processor generates the indication-of-interest subsequent to a failure to immediately match said at least one order in the ATS.

12. The system of claim 10 wherein the ATS is a non-ECN ATS system.

13. The system of claim 10 further comprising said processor blocks display of a security interest or orders to a user of the ATS.

14. The system of claim 10 wherein the preset trade amount for a particular security necessary to generate an IOI is equal to or more than 10,000 shares of the security.

15. The system of claim 10 wherein the immediate execution order is an Immediate-Or-Cancel ("IOC") order.

16. The system of claim 10 wherein the immediate execution order is a FOK order.

17. The system of claim 10 wherein the pass-through order is a Good-Til-Date ("GTD") order.

18. The system of claim 10 wherein the pass-through order is a GTC order.

19. A non-transitory computer-readable medium having instructions adapted to be executed by a processor, said medium configured to generate an indication-of-interest ("IOI") with respect to a particular security in an Pass-Through Alternative Trading System ("ATS"), and transact upon contra-flow with respect to said Indication of Interest ("IOI"), said instructions comprising:

obtaining at least one order to buy or sell a specified amount of a security within a price range, wherein said at least one order has an ultimate destination other than the ATS initially receiving said at least one order and wherein said at least one order is a pass-through order or immediate execution order;

aging, by a timer, said at least one order for a period of time before passing said at least one order to its ultimate destination, or canceling said at least one order is required;

aggregating said at least one aged order with other orders during the aging period;

generating, at time x, an IOI to buy or sell the specified amount of the security within the price range when said aggregated aged orders meet a preset trade amount for the security and are executable within a spread favorable to the ATS;

transmitting the IOI to one ATS IOI subscriber; and transacting upon receipt of a contra-flow order responding to the IOI transmitted at a time y when the spread is favorable to the ATS, and canceling any remaining portion of the IOI not transacted upon during the aging period.

* * * * *